May 29, 1934. T. M. ALEXOVITS 1,960,522
TABLE FEEDER FOR CRUSHED MATERIAL
Filed March 7, 1931 3 Sheets-Sheet 1
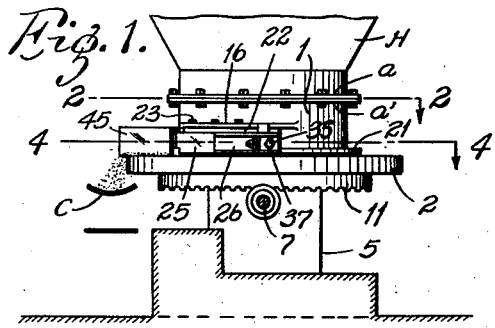
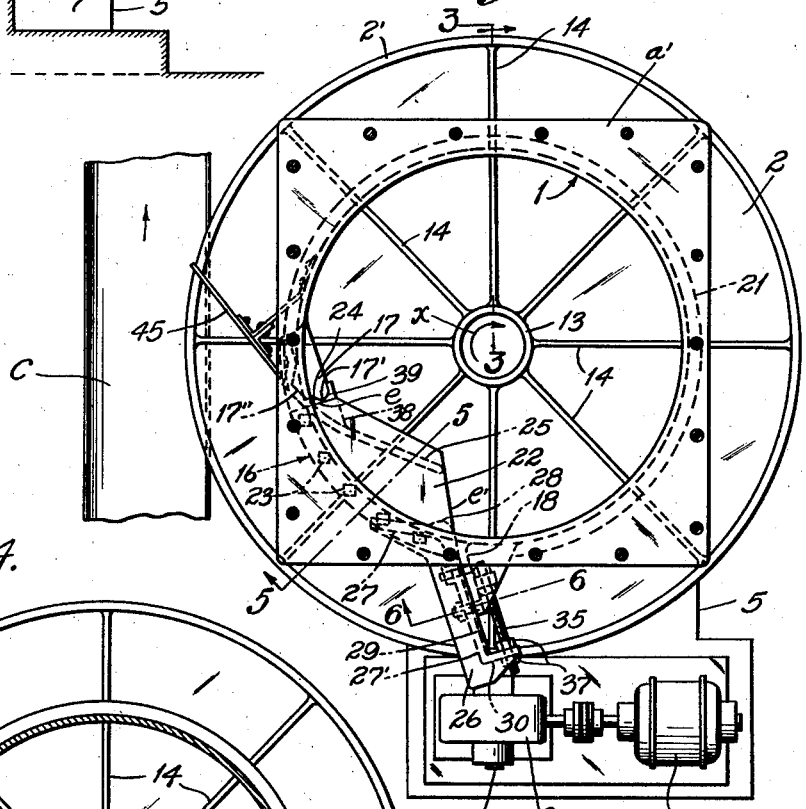
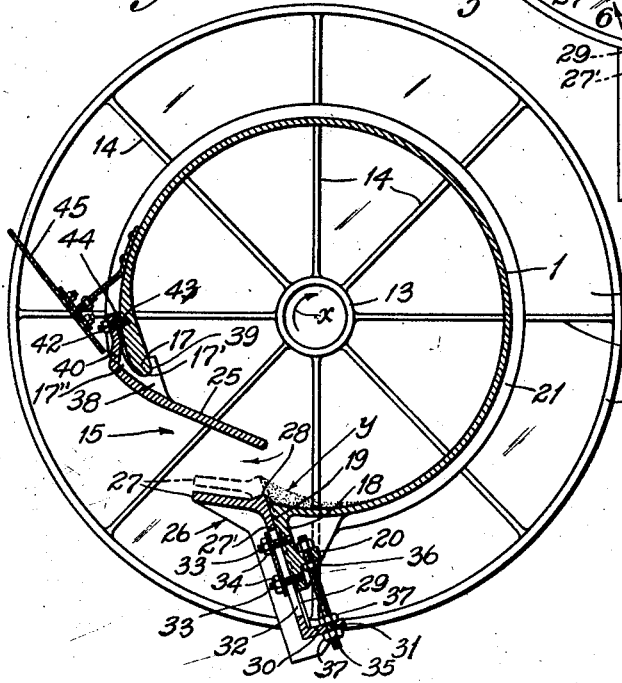
INVENTOR:
THOMAS M. ALEXOVITS.
BY Harry A. Berner
ATTORNEY May 29, 1934.   T. M. ALEXOVITS   1,960,522
TABLE FEEDER FOR CRUSHED MATERIAL
Filed March 7, 1931   3 Sheets-Sheet 2
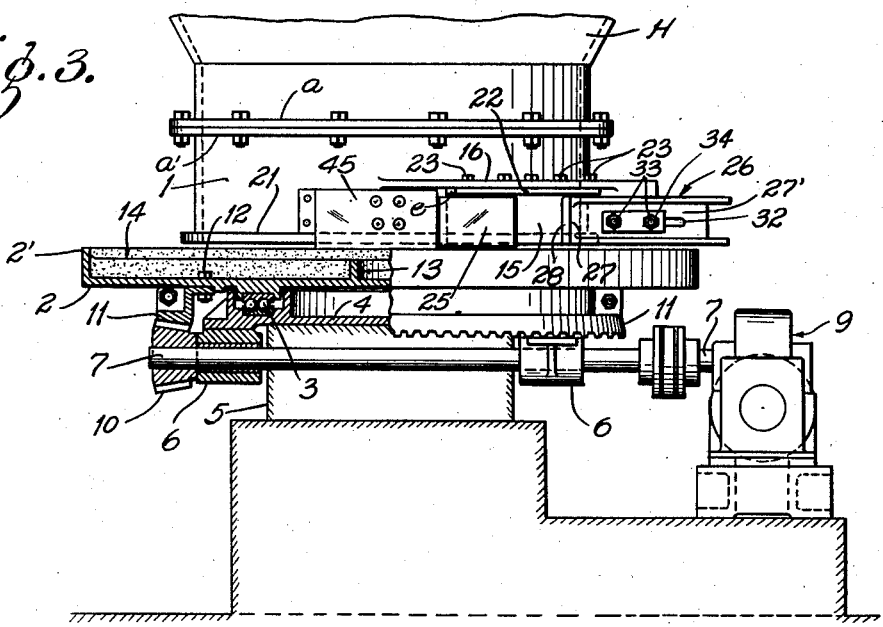
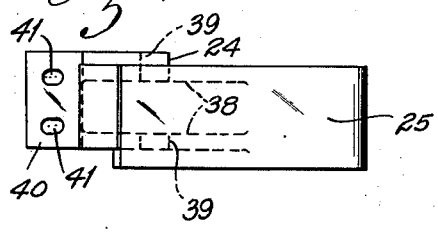
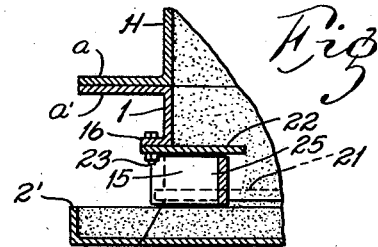
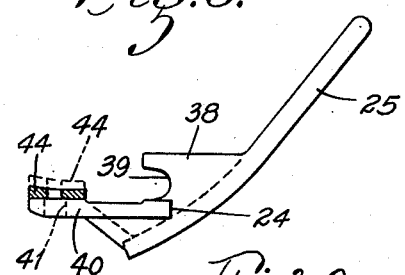
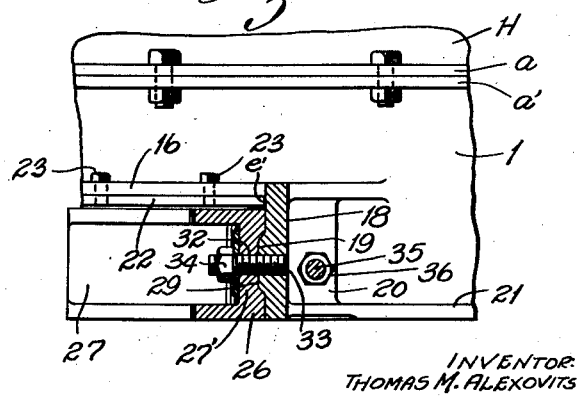
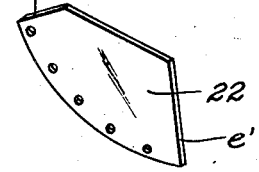
INVENTOR.
THOMAS M. ALEXOVITS
By Harry A. Benner
ATTORNEY.

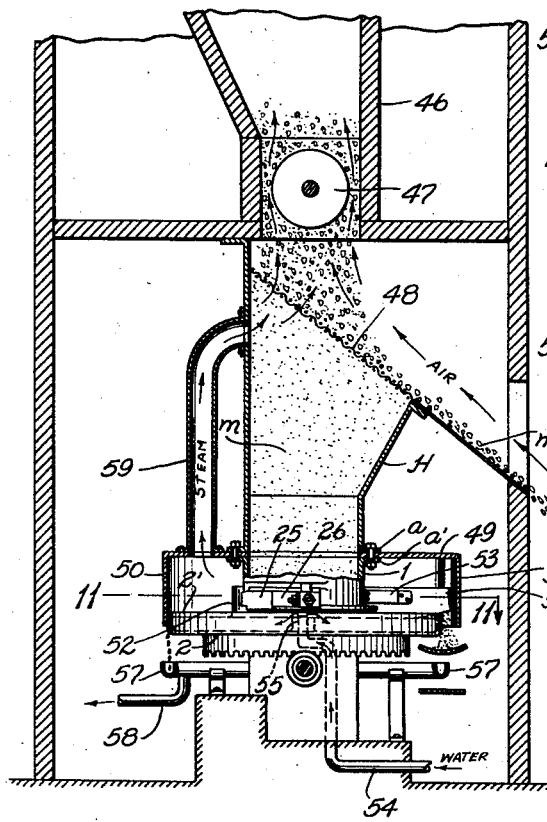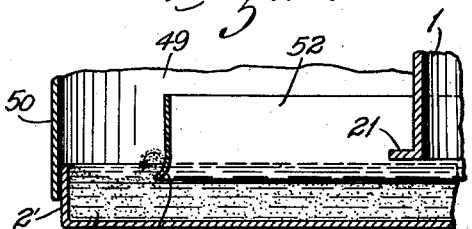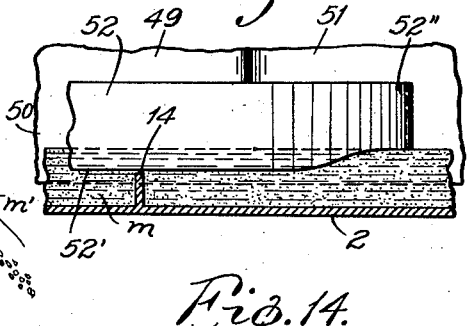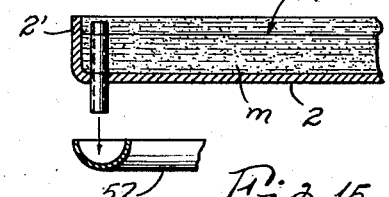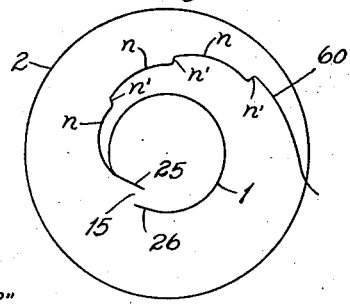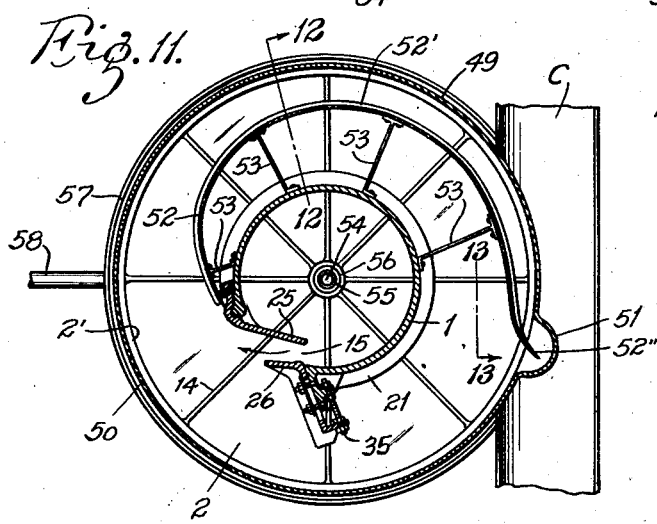

Patented May 29, 1934

1,960,522

UNITED STATES PATENT OFFICE 1,960,522

TABLE FEEDER FOR CRUSHED MATERIAL

Thomas M. Alexovits, New York, N. Y., assignor to John E. Greenawalt, New York, N. Y.

Application March 7, 1931, Serial No. 520,885

6 Claims. (Cl. 83—44)

My invention has relation to improvements in table feeders for crushed ore or equivalent material to facilitate the handling thereof in connection with sintering or other metallurgical operations. Briefly, the invention comprises a rotatable circular table positioned beneath a material hopper with which it has operative connection by a suitable throat embodying an adjustable discharge orifice through which the material passes from the throat to the table to be subsequently discharged onto a conveyor.

Among the objects of the invention are the following: forming the table in the shape of a pan whereby a layer of material is constantly maintained on the table for a wearing surface; providing means for regulating and controlling the quantity of material flow onto the table; constructing the material orifice in a manner to prevent its being clogged by the packing of material therein; disposing the plow, or element, that measures off the quantity of material for discharge from the table in a manner that will prevent wear by abrasion from the material itself on the bottom edge of the throat. It is also the object of the present invention to provide a table feeder for finely crushed material in a hot state comprising cooling means for reducing the temperature of the material as it traverses the table feeder. Further and other advantages will be better apparent from a detailed description of the invention in connection with the accompanying drawings in which:

Figure 1 is a side elevation of my improved table feeder shown in operative connection with the bottom of a material hopper; Fig. 2 is an enlarged horizontal cross-section taken on the line 2—2 of Fig. 1; Fig. 3 is a combined side elevation and vertical cross-section taken on the line 3—3 of Fig. 2; Fig. 4 is a vertical cross-sectional detail taken on the line 4—4 of Fig. 1; Fig. 5 is a cross-sectional detail taken on the line 5—5 of Fig. 2; Fig. 6 is also a cross-sectional detail taken on the line 6—6 of Fig. 2; Fig. 7 is a side elevation of the inside scraper, or plow; Fig. 8 is a plan view thereof; Fig. 9 is a perspective view of the top plate bordering the throat discharge orifice; Fig. 10 is a combination side elevation and vertical longitudinal section showing my improved table feeder associated with a hopper and adapted for cooling hot material; Fig. 11 is a horizontal cross-section taken on the plane indicated by the line 11—11 on Fig. 10; Fig. 12 is a cross-sectional detail taken on the line 12—12 of Fig. 11; Fig. 13 is a cross-sectional detail taken on the line 13—13 of Fig. 11; Fig. 14 is a modification showing overflow pipes for the cooling water adapted to discharge into a circular trough; and Fig. 15 is a diagrammatic view of a further modified form of outside scraper for moving the material over the rotating table.

Referring to the drawings H represents a storage hopper for ore or other material, terminating at its lower end in a flange $a$, to which is bolted the flange $a'$ of a throat casting 1. A circular table 2 is disposed below the throat casting 1 and supported on ball-bearings 3 carried by a foundation ring 4 secured on the foundation 5. The foundation ring carries a pair of bearings 6, 6 secured to it at diametrically opposite points in which are mounted a drive shaft 7 connected to a drive motor 8 by a gear reducing set within the gear case 9. This driving mechanism is old and will not be described in detail. The end of shaft 7, opposite to that in the gear case 9 has a pinion 10 fixed to it which meshes with a ring gear 11 secured by a plurality of bolts 12 to the bottom of the table 2. Thus, when the motor 8 is actuated, the table 2 will be rotated in the direction of the arrow at a reduced speed.

The table 2 has an upwardly turned peripheral flange 2' and an inner annular flange 13 somewhat lower than the flange 2' and a series of radially disposed ribs 14 extend between flange 2' and flange 13. The inner flange and the ribs are primarily to stiffen the table, while the outer flange 2' is for the purpose of making the table a holder for the material, so that when the table is in operation there will be maintained on it a layer of material as thick as the height of flange 2' onto the top of which the material that issues from the throat casting will discharge. Thus, the material on the table provides a working surface for the other material to flow upon, taking the wear due to the abrasive effect of the mineral material off the table proper and prolonging indefinitely the life thereof.

An orifice 15, comprising a radial extent of approximately 60° is formed in the throat casting 1, the upper margin of said orifice being bordered by a flange 16 and one end of the orifice being bordered by a rounded lip 17 formed integrally with the wall of the throat casting. A flange 18 projects laterally from the throat casting adjacent to the other end of orifice 15, said flange 18 having a tongue 19 extending across its face (parallel to the lip 17) and having a perforated web 20 on the side opposite to the tongue 19. The bottom edge of the throat casting 1 is provided with an annular flange 21 recessed, however at the orifice 15.

A top plate 22 is secured by bolts 23 to the flange 16 and projects into the throat casting 1 in a horizontal plane adjacent to the upper edge of orifice 15. The edge e of the plate 22 abuts against flange 24 of a plow, or inside scraper, 25 (to be more fully described hereinafter) and the edge e' of the top plate engages with the outer face of bracket 18. Thus, the plate 22 is rigidly held above, and extends inwardly from, the outlet orifice 15 to cut off the volume of material flow through said orifice. A cheek plate 26 is secured to the bracket 18 and forms an adjustable wall extension adjacent to the orifice 15, said cheek plate when withdrawn being substantially tangent to the circumferential wall of the throat casting 1. The cheek plate has a channel arm 27 extending laterally from it and is provided with a rounded nose 28 at the point of connection between said plate and bracket arm for the purpose shortly to be explained. The outer surface of the bracket arm 27 is provided with a groove 29 and the end of said arm projects upwardly at right angles thereto to form a lug 30, in the top edge of which is an open slot 31. The web 27' of the channel arm 27 has a long slot 32 formed in it to receive studs 33 when the channel arm is fitted against the bracket 18 with the tongue thereof disposed in the groove 29 of the channel 27. Nuts 34, 34 are then passed over the studs 33 to hold the arm 27 in place. The adjustment of the cheek plate 26 into, and out of, the throat orifice 15 is effected by means of a bolt 35 traversing the perforated lug 20 of bracket 18 and locked thereto by a lock nut 36, said bolt extending through the open slot 31 in the flange 30 which is locked to the bolt by means of lock nuts 37, 37. When it is desired to move the cheek plate inwardly to cut down the width of orifice 15, the nuts 34, 34 are loosened, as well as the nuts 37, 37, which permits the bracket arm 27 to slide against the face of bracket 18. When the cheek plate 26 is in the desired position, the nuts are again made fast, holding the plate securely. The plow 25 above referred to, has a pair of flanges 38, 38 projecting from its rear face in which are formed rounded recesses 39, 39 shaped to receive the rounded edge 17' of lip 17, and a heel plate 40 projects from the plow beyond the flange 38 and is provided with spaced slots 41, to receive bolts 42, 42 which are secured into tapped openings 43, 43 in the lip 17 to the rear of the nose thereof. Flange 21 terminates in an inclined face 17'' adjacent to the rounded edge 17' of lip 17 and the rear edge of plow 25 bears against this inclined face 17''. The angle at which the plow 25 projects through the orifice 15 may be varied by interposing shims or filler blocks 44 between the heel plate 40 and the side of the lip 17. Obviously, the thicker the filler interposed at this point, the more the plow will be swung away from cheek plate 26 and if there is no filler block interposed, the plow will incline toward the cheek plate its maximum amount. Thus, the orifice 15 can be narrowed to a considerable extent by adjusting both the plow 25 and the cheek plate 26 so as to bring them toward each other their maximum amount. It will be observed that for any adjustment of these elements which define the width of the orifice, the orifice tapers, or flares outwardly to relieve the resistance to the passage of the material through the orifice. The rounding of the edge 28 also assists in relieving the frictional resistance against material as it flows into the orifice, or, more strictly speaking, through the passageway between top plate 22, plow 25, and cheek plate 26.

In the operation of my improved table feeder the throat casting 1 being in communication with the hopper H above it is full of finely crushed material known as "fines", which material is to be fed onto a conveyor C for transporting it to some desired point. As the table 2 revolves in the direction of the arrow $x$ the material in the throat 1 will be assisted by the movement of the table to flow through the discharge orifice 15 between the plow 25 and gate 26. The forward edge of the plow cuts off the material and determines the quantity that is allowed to flow through the discharge orifice, this quantity being controlled by the adjustable gate 26 as heretofore pointed out. The gate directs the flow of the material in a direction more or less tangential to the movement of the material on the rotating table 2 and prevents the material from flowing directly to the periphery of the table. As the material is discharged through orifice 15 it accumulates upon the material that has already been deposited on the table and is carried along until it encounters outside scraper 45 supported from the throat casting 1 which scraper brushes, or scrapes, accumulated material from the table 2 onto the conveyor C. Obviously, there will be a certain amount of material pass under the scraper 45 which travels around with the table 2 and serves as a supporting surface for the subsequent accretions of material passing through orifice 15.

It will be observed (Fig. 4) that when the orifice 15 is narrowed down by adjusting the gate 26 inwardly a fillet of material $y$ will build up in the corner between the gate 26 and the wall of throat 1 to serve as an extension of the throat wall over which the discharging material rolls. The rounding of the nose 28 has a tendency to lessen the friction opposing the flow of material through the orifice and thus insures a steady flow thereof. It will also be observed (Figs. 3 and 5) that the lower edge of both the inside scraper 25 and outside scraper 45 are extended downwardly below the bottom of flange 21 so that the wear caused by the abrasion of the flowing material will be on the lower edge of these scrapers and not on said flange. Obviously, it is a more simple matter to renew the scrapers when worn than to replace the throat casting, and for this reason it is desirable to maintain the throat casting as free from wear as possible.

In Figs. 10 to 14 inclusive, I show my improved table feeder modified in construction so as to include means for cooling the hot sintered material that enters the feeder from the hopper H. Immediately below the storage hopper 46 is a crusher 47 shown more or less conventionally, which serves to close the hopper 46 against the discharge of material except as fed by the crusher, but permits the passage of air into the hopper 46 for cooling purposes as shown. An inclined screen 48 is disposed below the crusher 47 and receives the material as it leaves the crusher, separating the more finely crushed component $m$ from the coarser component $m'$, the former entering the hopper H and the latter discharging from the screen onto a conveyor, or railway car (not shown). A hood 49 is secured between flange $a$ at the end of hopper H and flange $a'$ at the end of throat casting 1, the side walls 50 of said hood extending downwardly slightly below the peripheral flange 2' of table 2 with which it is in comparatively close relation, except for the enlargement 51 to permit the discharge of material from the table 2 as will be decribed later. In this adaptation of the invention, the inside scraper 25 and the gate plate 26 are substantially the same as in the form heretofore described, but the outside scraper 52 is in the form of a spiral extending from the heel of inside scraper 25 around approximately one-half the circumference of the table (as shown in Fig. 11), in which position it is supported by a series of structural members 53 from the throat casting 1. It will be observed (Fig. 12) that the bottom edge 52' of the scraper 52 extends slightly below the top edge of the table flange 2' and is curved outwardly, and the outer end 52'' of the scraper 52 extends slightly upwardly and beyond the table flange 2' into the enlargement 51 of hood 49. A water supply pipe 54 is brought up through and opening 55 in a boss 56 at the center of the table 2 whereby the material on the table may be wetted for the purpose of cooling the same. A considerable amount of water may be necessary for this purpose and any surplus will discharge over the flange 2' of the table into a gutter 57, from which it drains through a drain pipe 58. Naturally, there will be a large amount of steam given off from the table by virtue of the evaporation of the water, which steam accumulates in the hood 49 from which it is vented through a flue 59 into the upper part of hopper H from which it passes to the hopper 46 together with incoming air. This steam will also contribute as a factor in lowering the temperature of the hot sinter in the hopper 46.

In the operation of the modified form of the invention, the sinter "fines" $m$ will discharge through the throat orifice 15 onto the table 2 which will be kept saturated by the water issuing through the pipe 54; then, as the table rotates, the accumulations of material extending above the plane of the lower edge of the scraper 52 will continually be pushed outwardly toward the edge of the table 2. As the material piles up against the plow 52, it will continually roll down upon itself to the edge of the table, which rolling action is facilitated by the curved lower edge of the plow, or scraper. By virtue of this rolling action of the material as it progresses toward the edge of the table, it will be thoroughly mixed with the water on the table and cooled thereby. The rolling action of the material over the surface of the table also serves to draw the material outwardly in a thin stream and maintain it in a loose, fluffy condition. As the material approaches the discharge end 52'' of the scraper, it will be pushed over the flange 2' into the enlargement 51 of the hood 49 from which it is discharged onto the belt conveyor C.

In Fig. 15 I show a diagram of a scraper 60 which has gradual pitches $n$, $n$ and abrupt pitches $n_1$, $n_1$ alternated around the table so that the material will be rolled over and abruptly stretched out as it progresses around the table to the discharge end of the scraper.

Having described my invention I claim:

1. In combination with a hopper having a discharge throat, a table feeder for crushed material disposed below said throat, said feeder comprising a rotatable table having a perpheral flange, said throat having a discharge orifice opening onto the table, and means disposed above the table flange for scraping from the table the material accumulations issuing from said orifice.

2. In combination with a hopper having a discharge throat, a table feeder for crushed material disposed below said throat, said feeder comprising a rotatable table, said table having a peripheral flange, said throat having a discharge orifice adapted to discharge material onto said table, and a scraper for brushing material accumulations from the table, said scraper having its lower edge appreciably above the supporting plane of the table.

3. In combination with a hopper having a discharge throat, a table feeder for crushed material disposed below said throat, said feeder comprising a rotatable table having a peripheral flange, said throat having a discharge orifice opening onto the table, a plow element extending into the throat from said orifice for cutting off the flow of material through the orifice, and means disposed above the plane of the table flange for ejecting from the table accumulations of material thereon.

4. In combination with a crushed material hopper having a discharge throat, a table feeder comprising a rotatable table disposed below said throat and spaced therefrom, said throat having a material discharge orifice in the side thereof, said orifice being defined by a material cut-off plow, a top plate, and an adjustable gate forming a reentrant discharge passage-way from the throat, and means for ejecting material accumulations from the throat.

5. In combination with a crushed material hopper having a discharge throat, a table feeder comprising a rotatable disc table disposed below said throat and spaced therefrom, a hood disposed above said table, a flue connecting said hood with the material hopper, means for supplying water to the material on said table, said throat having a discharge orifice opening onto said table, and means for ejecting material accumulations from the table.

6. In combination with a crushed material hopper having a discharge throat, a table feeder comprising a rotatable table disposed below said throat and spaced therefrom, said throat having a material discharge orifice in the side thereof, said orifice being defined by a material cut-off plow, and an adjustable gate forming a reentrant discharge passage-way from the throat, and means for ejecting material accumulations from the throat.

THOMAS M. ALEXOVITS.